Patented Oct. 8, 1935

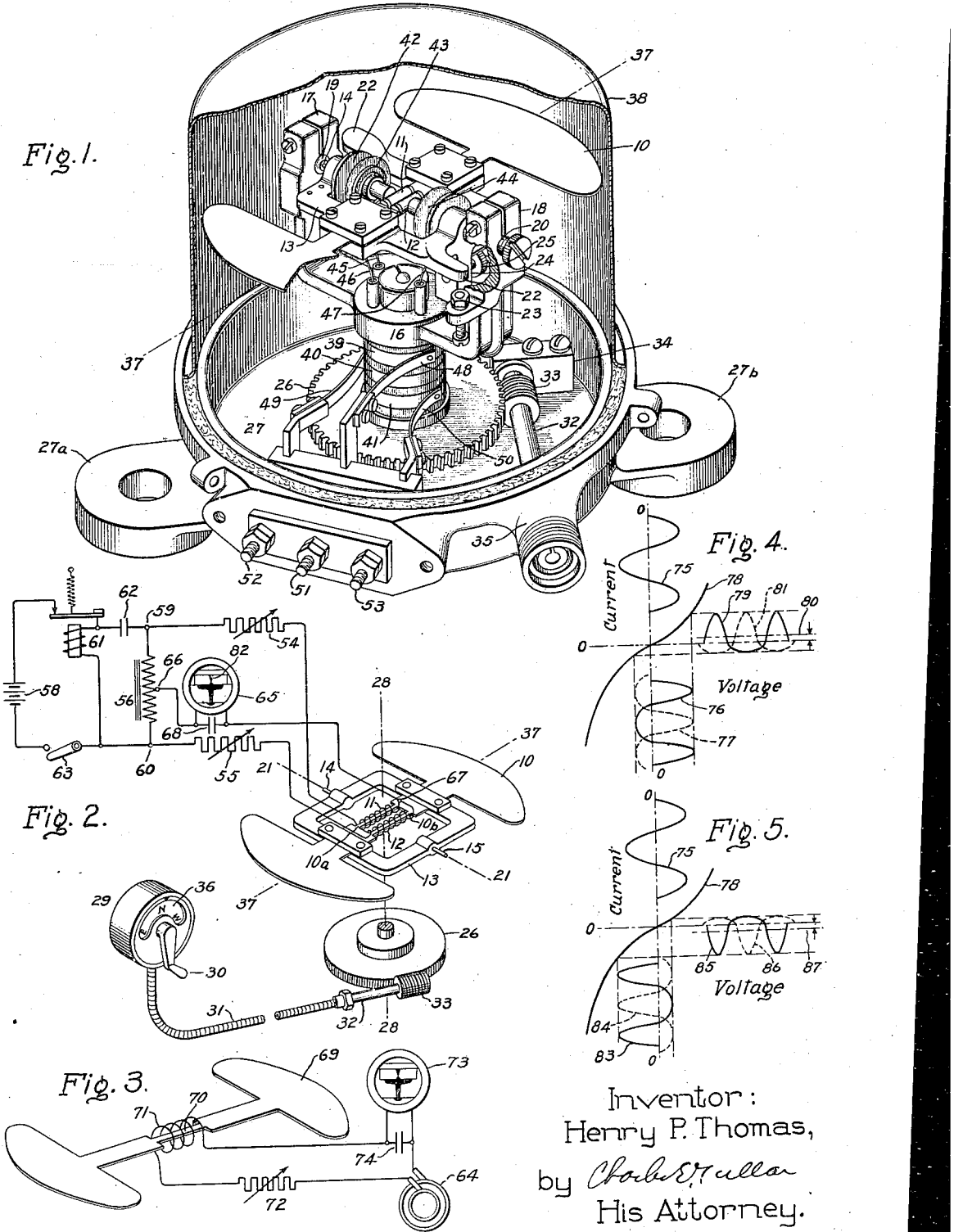

2,016,977

UNITED STATES PATENT OFFICE 2,016,977

DIRECTION RESPONSIVE SYSTEM

Henry P. Thomas, Schenectady, N. Y., assignor to General Electric Company, a corporation of New York Application December 1, 1931, Serial No. 578,406

25 Claims. (Cl. 33—204)

My invention relates to direction responsive systems, more particularly to systems responsive to direction with respect to a magnetic field, and has for its object the provision of a simple reliable, inexpensive and improved system of this character.

More specifically this invention relates to remote indicating compass systems, such as are employed upon aircraft and the like, and another object of this invention is the elimination of all high-speed and continuously moving parts as well as parts subject to excessive wear such for example as the armature, commutator and cooperating brushes of the conventional earth inductor compass.

A further object of the invention is the provision of a compass of this character having no moving parts and yet providing unique indications for deviations in opposite directions from a predetermined position in the earth's magnetic field.

An advantage of this invention is that the maintenance cost of the compass is considerably reduced due to the elimination of parts subject to excessive wear and the accuracy of its indication is improved by the elimination of high speed rotating parts and their resultant vibrations.

In carrying this invention into effect in one form thereof, a periodically varying voltage is supplied from a suitable source, and magnetic field responsive means are provided for effecting variation in the wave form of the voltage together with indicating means responsive to this voltage wave form variation.

More specifically, an electric circuit is supplied with a symmetrical alternating voltage. The magnetizing winding of a reactor having a permeable core is connected to this circuit together with a non-linear resistance and a zero center direct current indicating device. If a steady direct current flux, such for example as the flux due to the earth's magnetic field, is super-imposed upon the alternating flux of the core due to the magnetizing winding, this super-imposed steady flux will produce a dissymmetry in the shape of the voltage wave. In general, the voltage wave is altered so that it is steeply peaked on one side of the zero axis and noticeably flattened on the other side; both half waves however being of equal area and having no direct current component. When such an unsymmetrical alternating voltage wave is impressed upon a resistance having a non-linear characteristic, it produces a component of direct current in the circuit and the magnitude and direction of this direct current component is indicated by the indicating instrument. The polarity of this direct current component depends upon the direction in which the earth's flux traverses the core and its magnitude depends upon the amount of the flux. If the core occupies a position in the earth's field in which none of the flux traverses the core, there will be no direct current component in the circuit and the indicating instrument will read zero. However, if the core deviates from this position in either direction so that the earth's flux traverses the core in one direction or the other, a component of direct current having a polarity dependent upon the direction of deviation appears in the circuit and the indicating instrument indicates the direction of such deviation. Thus it will be seen that by mounting the device upon a movable body, such as an aircraft, and orienting the core to a position in which its longitudinal axis lies at right angles with the direction of the horizontal component of the earth's magnetic field, i. e., east and west, when the craft is headed upon a selected course, the indicating instrument indicates zero as long as the craft remains headed in the desired direction and likewise indicates the direction and extent of departure from this direction.

For a better and more complete understanding of the invention reference should now be had to the following specification and to the accompanying drawing in which Fig. 1 is a view in perspective of the compass structure, parts being broken away to reveal the structural arrangement of the magnetic field responsive element and its external circuit connections; Fig. 2 is a simple diagrammatical illustration of an embodiment of the invention and showing the magnetic field responsive element and the external circuit in which it is connected; Fig. 3 is a simple diagrammatical illustration of a modification; and Figs. 4 and 5 are explanatory charts of circuit characteristic curves which serve to illustrate the operation of the system.

In illustrating the invention in one form thereof, it is shown as embodied in a compass system, particularly adapted for use upon aircraft and the like, but it will of course be understood that the invention may be embodied in other forms. Referring now to the drawing, a magnetic field responsive means illustrated as comprising an elongated magnetic vane 10 having flared ends and central constricted portions 10a and 10b, upon which coils 11 and 12 are respectively arranged, thus constituting a reactance device of which the constricted portions 10a and 10b of the magnetic vane form the core and coils 11 and 12 form the reactive windings. Although the magnetic vane member 10 may be made of any suitable magnetic material it is preferably made of a material having an extremely high permeability such as the magnetic alloy consisting of approximately 78½% of nickel and 21½% of iron and sold on the market under the trade name of Permalloy.

The magnetic vane 10 is secured in a rectangular shaped carriage 13, the opposite lateral arms of which are respectively provided with centrally disposed pivots 14 and 15. The carriage 13 is supported by a trunnion member which is illustrated as comprising a central post 16 to which two vertical arms 17 and 18 are integrally connected. As shown, the upper extremities of these arms are provided with jewelled bearings 19 and 20 in which the pivots 14 and 15 are respectively journaled to provide for rotation of the magnetic vane 10 about a horizontal axis defined by the center line 21—21 of the pivot, in response to rotation of the craft upon which the compass is mounted, about its fore and aft axis. This rotation of the magnetic vane 10 about the center line 21—21 is limited by any suitable means such for example as the projecting lugs 22 upon the carriage 13 and their respectively cooperating adjustable stop screws 23 which may be advanced or retracted to limit the rotation of the magnetic vane 10 to any desired amount.

For the purpose of stabilizing the magnetic vane 10 in a horizontal plane so that it will be subjected only to influence of the horizontal component of the earth's magnetic field the opposite lateral arms of the carriage 13 are provided with respective depending pendulous members 24. As thus constructed, the center of gravity of the carriage 13 is well below the center line 21—21 of the pivot and it thus acts as a pendulum, the effective length and periodicity of which may be varied within limits by varying the position of the adjustable nuts 25 with which the pendulous members 24 are provided as illustrated.

The central post 16 of the trunnion is suitably secured to a worm gear wheel 26 which is journaled in the base member 27 for rotation about a vertical axis defined by the center line 28—28 of the central post 16. In order that the magnetic vane member 10 may be oriented into any desired position of azimuth, a course setting device 29 is provided which as shown comprises an azimuth crank 30 connected through suitable gearing (not shown) to one extremity of a flexible cable 31, the opposite extremity of which is connected to a worm shaft 32 which projects through the base 27 and is provided at one extremity with a worm 33 engaging the worm wheel 26. The worm shaft 32 is suitably journaled in bearings provided in bearing block 34 and in the neck portion 35 of the base through which the worm shaft projects.

The azimuth crank 30 is connected by means of suitable reduction gearing (not shown) having the same ratio as the worm 33 and worm wheel 26 to a rotatable card 36 calibrated with the usual cardinal compass markings. Since the gear ratio between the azimuth crank 30 and the compass card 36 is equal to the gear ratio between the worm and worm wheel, the compass card 36 and the magnetic vane 10 are rotated through one complete revolution in the same period of time responsively to rotation of the azimuth crank 30. Connections between the azimuth crank 30 and the worm wheel are initially made so that the compass card 36 and its cooperating index indicate the direction in which the craft is headed when the longitudinal axis 37—37 of the magnetic vane occupies a predetermined position (preferably east and west) with respect to the horizontal component of the earth's magnetic field.

A substantially air-tight casing made of any suitable non-magnetic material such for example as brass or aluminum encloses the above-described structure. Since the casing 38 is non-magnetic, it offers no reluctance to the flux of the earth's magnetic field and consequently the earth's flux traverses the magnetic vane member 10 in a longitudinal direction when the longitudinal axis 37 of the vane occupies any position in the earth's magnetic field other than an east-west position. The flared pole tips serve the dual function of concentrating the flux of the earth's magnetic field in the constricted core portions 10a and 10b and of damping the rotation of the vane 10 and the carriage 13 about the horizontal axis 21—21. This damping action may be further increased if desired by providing the casing 38 with an internal partition arranged centrally between the flared pole tips of the magnetic vane 10 and provided with a constricted air passage for restricting the flow of air from one side of the partition to the other responsively to the rotation of the vane 10 about the horizontal axis 21—21. The base 27 is provided with ear portions 27a and 27b which may be bolted to any suitable support in the craft located in a desirable location remote from the engine and other iron parts likely to influence the compass readings, such for example as in the tail of the fuselage or in the wing.

One terminal of the coil 11 is connected to a corresponding terminal of the other coil 12 to form a common terminal and this common terminal together with the two opposite terminals of the coils 11, 12 are brought out to respective slip rings 39, 40, and 41 arranged upon the central post 16 of the trunnion and insulated from each other by any suitable insulating material. Leads from these coil terminals are preferably brought out to the slip rings through flexible connections sufficiently heavy to prevent breakage due to mechanical vibration and sufficiently flexible so as not to prevent the magnetic vane 10 from always remaining horizontal. Accordingly small instrument springs 42, 43, and 44 having a torque of approximately one hundred twenty-five dyne-centimeters per radian are included in the flexible connections 45, 46 and 47 respectively between the coil terminals and the slip rings. From the slip rings 39, 40, and 41, connections are brought out through the base 27 by means of respectively cooperating brushes 48, 49, and 50 and their respectively connected terminal posts 51, 52, and 53 which are suitably insulated from each other and are secured in and project through a terminal board provided in the base.

As shown in Fig. 2 of the drawing the coils 11 and 12 are connected to an external bridge circuit in such a manner that the coil 11 and the non-linear resistance device 54 form one arm of a bridge and the coil 12 and a non-linear resistance device 55 form a second arm of the bridge, whilst the upper and lower halves of the reactive winding of an iron cored reactor 56 form the third and fourth arms of the bridge respectively. A non-linear resistance is a resistance, the current through which does not vary directly as the impressed voltage. The non-linear resistances 54 and 55 may be made of any suitable material having a non-linear characteristic such as copper oxide or preferably a composition of silicon carbide crystals held together by a suitable binder such as the resistance material sold on the market under the trade name Thyrite. Resistance material of this character is described in U. S. Patent 1,822,742, Karl B. McEachron, dated Sept. 8, 1931.

An alternating or periodically varying voltage is supplied to the bridge circuit from any suitable source such for example as that represented in the drawing by the battery 58 to the terminals of which the bridge points 59 and 60 are respectively connected; a suitable electro-magnetically operated make and break contact device known in the art as a "buzzer" being included in the connection between the positive terminal of the battery and the bridge point 59 for periodically interrupting the current. A condenser 62 is also included in the connections between the contact of the buzzer 61 and the bridge point 59 so as to eliminate any direct current component in the voltage supplied to the terminals 59, 60 and thus insure that an alternating voltage is supplied to the bridge.

The sensitivity of the compass is considerably increased when the wave form of the applied voltage is steeply peaked. Because of this fact, the battery supplied buzzer is extremely advantageous, since the wave form of the voltage supplied to the compass circuit by the buzzer is sharply peaked due to the periodic interruption of the current by the buzzer contacts. The buzzer 61 has the further advantage that it is very inexpensive and is easily adjusted. A suitable manually operated switch 63 is connected in the energizing circuit of the buzzer for the purpose of rendering the device inactive when the compass is not in use. Although the battery 58 and buzzer 61 supplied therefrom constitute a satisfactory and even advantageous source of supply for the bridge circuit, it will of course be understood that the invention is not limited to this particular form of supply source since any other suitable source of periodically varying voltage such for example as the small alternating current generator 64 illustrated in the modification of Fig. 3 may be employed instead. When the compass is installed upon an aircraft, the generator 64 may be the tachometer generator employed to measure the R. P. M. of the engine.

The coils 11 and 12 upon the constricted portions 10a and 10b of the magnetic vane are designed so that these constricted portions of the vane are completely saturated during each half cycle of the alternating current which flows in these coils, thus constituting a reactance device of the type known in the art as a saturable reactor. It will also be observed that the coils are so connected in the bridge circuit that at any instant current flows in respectively opposite directions in each coil and thus when a steady direct current flux such as the flux due to the earth's magnetic field traverses the magnetic vane 10 in a longitudinal direction, this steady direct flux is superimposed upon the alternating fluxes in the constricted portions so that during one half cycle it adds to the alternating flux in one of the constricted portions and opposes the alternating flux in the other constricted portions whilst during the succeeding half cycle this steady flux opposes the alternating flux in the first mentioned constricted portion and adds to the alternating flux in the last mentioned constricted portion.

A suitable electroresponsive device 65 such for example as the direct current indicating instrument illustrated in the drawing as a galvanometer is connected across the normally equi-potential points of the bridge; one terminal of the galvanometer being connected to the mid-point 66 of the winding of the reactor 56 and the opposite terminal of the galvanometer being connected to the common point 67 of coils 11 and 12. It will of course be understood that the device 65 is not necessarily an indicating instrument, but may be any electroresponsive device for effecting a desired operation. As shown, the galvanometer 65 is provided with a zero center scale so that it identifies the polarity of any direct current voltage which exists between the normal equi-potential points 66 and 67 of the bridge. For the purpose of preventing any alternating current from flowing through the coils of the galvanometer, a suitable by-pass condenser 68 is connected across its terminals.

In the simplified modification of the invention illustrated in Fig. 3 of the drawing the mechanical structure and arrangement of the parts are similar in all respects with that previously described in connection with Fig. 1 with the exception that the magnetic vane 69 is provided with a single constricted portion 70 upon which is wound a single reactive coil 71. The vane 69 is also arranged to be rotated to any desired position in azimuth by means of a course setting device (not shown) similar in all respects to the course setting device 29 described in detail in connection with Fig. 2 of the drawing.

The external circuit in which the reactive winding 71 is connected is a simple circuit including a non-linear resistance device 72, a direct current indicating device 73 by-passed by a condenser 74 and a suitable source of periodically varying voltage such for example as that represented by the alternating current generator 64 included in series relationship with each other as illustrated. It will be understood, of course, that in this modification provision is only made for bringing out two leads for the coil 71 through the casing instead of three as described in connection with the circuit of Figs. 1 and 2.

When an alternating current generator or other source is employed instead of the battery supplied buzzer, the wave form of the applied voltage may be made as peaked as desired and the sensitivity of the compass accordingly increased by including a saturated core transformer in the supply connections.

With the above understanding of the elements and their organization in the completed compass system the operation of the compass itself will readily be understood from the detailed description which follows:

If it be assumed now that it is desired to fly a due northerly course, the pilot rotates the azimuth crank 30 until the north marking on the compass card 36 coincides with its cooperating stationary index marking at which time the magnetic vane will be rotated into such a position that its longitudinal axis will occupy an east-west position in the earth's magnetic field when the craft is headed in the desired direction. That is to say, for a due northerly course the longitudinal axis of the magnetic vane 10 is rotated to a position in which it is at right angles with the longitudinal axis of the craft so that when the latter is headed in a north direction the longitudinal axis 37 of the magnetic vane occupies an east-west position in the earth's magnetic field and consequently none of the magnetic flux of the earth's field traverses the magnetic vane in a longitudinal direction.

The operation of the system of Fig. 2 will best be understood by considering the bridge circuit as two separate and distinct series circuits connected in parallel relationship with each other, and considering the behavior of each of these circuits separately in connection with the explanatory chart of characteristic curves of Figs. 4 and 5, in which ordinates represent values of current and abscissae represent values of voltage. Thus considered, the upper half of the bridge constitutes one of these circuits and includes the upper half of the winding of the reactor 56, the non-linear resistance 54, the coil 11 on the constricted portion 10a, and the indicating device 65 all connected in series relationship with each other; whilst the lower half of the bridge constitutes the second series circuit and includes the lower half of the winding 56, the non-linear resistance 55, the coil 12 on the constricted portion 10b and the direct current indicating device 65 all connected in series relationship with each other. It will thus be seen that these two series circuits are connected in parallel relationship with each other through the indicating device 65.

As long as the craft adheres to its course and the longitudinal axis 37 of the magnetic vane remains at right angles to the direction of the earth's magnetic field, and provided the wave form of the applied voltage is symmetrical, the voltage of each of these series circuits is symmetrical about its zero axis, as represented by the sinusoidal shaped wave 75 in Fig. 4 of the drawing, and since the bridge is balanced the indicating device 65 reads zero and this zero reading indicates to the pilot that the airplane is headed upon the desired course. It will be understood that the wave shape of the voltage applied to this circuit as well as the wave shape of the voltage of the circuit itself is not necessarily sinusoidal. In fact, the wave form of the voltage supplied by the buzzer to the circuit, and consequently of the circuit voltage itself, is considerably steeper than a pure sinusoid and, as previously pointed out, this is desirable because of the resulting increase in the sensitivity of the compass. However, since the principle of operation is independent of the voltage wave form, the latter is illustrated as sinusoidal for the purpose of simplifying the explanation and facilitating the understanding of the operation.

If the airplane deviates from the desired course, the longitudinal axis of the magnetic vane no longer occupies an east-west position in the earth's magnetic field and consequently flux due to the earth's magnetic field traverses the vane in a longitudial direction and is superimposed upon the alternating fluxes produced in the constricted portions 10a and 10b by the coils 11 and 12. Assuming that the airplane deviates from the desired course toward the right the earth's flux will traverse the magnetic vane in a longitudinal direction from left to right, and this will add to the alternating current flux in the constricted portion 10a during one half cycle thereof and oppose the alternating current flux during the succeeding half cycle as a result of which saturation in the constricted portion is reached sooner during one half cycle than during the succeeding half cycle. As a result of this the wave form of the circuit voltage is rendered unsymmetrical about its zero axis, that is, one half cycle of the wave, for example the positive half cycle is steeply peaked whilst the succeeding half cycle is noticeably flattened as represented in Fig. 4 of the drawing by the curve 76 in which values on the right hand side of the zero axis are designated as positive values and values on the left hand side of the zero axis are designated as negative. Although the wave form of the voltage is unsymmetrical, both half cycles are nevertheless of equal area and in the absence of the non-linear resistance 54 in the circuit the indicating device 65 would still read zero.

In a similar manner the wave form of the voltage of the lower series circuit is rendered unsymmetrical but of equal area on opposite sides of its zero axis. However, since the potential of the lower reactor terminal 60 is negative at the instant that the potential of the upper reactor terminal 59 is positive, the voltage wave of the lower series circuit is 180° out of phase with the voltage wave of the upper series circuit and since the magnetic flux of the earth's field traversing the vane 10 opposes the alternating flux in the constricted portion 10b when it adds to the alternating flux in the constricted portion 10a, and vice versa, the negative half cycle of this voltage wave is flattened whilst the positive half cycle is steeply peaked in the manner represented by the curve 77.

The relationship between the current flowing through the non-linear resistance 54 and the voltage impressed thereon is represented by the curve 78 and it will be seen that the current through this resistance increases approximately with a function of the cube of the impressed voltage. By projecting instantaneous values of the voltage curve 76 upon the non-linear resistance current curve 78, a curve of the instantaneous values of the current through the non-linear resistance 54 is obtained the wave form of which is represented by the curve 79 in which values above the zero axis are designated as positive and values below the zero axis are designated as negative. The areas of the positive half cycle of the curve 79 are greater than the areas of the negative half cycles and consequently the current has a positive direct current component the magnitude of which is designated by the broken line 80 parallel to the zero axis. This rectifying action of the non-linear resistance is due to the fact that an increase in voltage produces a disproportionate increase in the current. Since the voltage increases to greater instantaneous values during the peaked half cycle than during the flattened half cycle, the current likewise increases to disproportionately greater instantaneous values during the peaked half cycle, the integrated result of which is that more current flows during the peaked half cycle than during the flattened half cycle.

Similarly by projecting instantaneous values of the voltage wave 77 upon the non-linear resistance current curve 78, a curve of the instantaneous values of the current through the non-linear resistance 55 is obtained which is represented by the dotted curve 81. The current represented by this curve likewise has a positive direct current component the magnitude of which is substantially equal to that represented by the broken line 80. These components of direct current flow through the coils of the indicating device 65 so that the needle 82 is deflected from its central zero position in a given direction, for example to the left, thus indicating to the pilot that the airplane has deviated from its course to the right and he must steer to the left to bring it back to the desired course. The deflection of the needle is proportional to the magnitude of the direct current component 80 which in turn is proportional to the amount of the earth's flux which traverses the magnetic vane and, therefore proportion to the deviation of the airplane from the desired course.

It will be clear from the above description that if the airplane deviates from its course to the left the flux due to the earth's magnetic field will traverse the magnetic vane in the opposite direction with the result that the wave forms of the voltages impressed upon the non-linear resistances 54 and 55 are rendered unsymmetrical on opposite sides of the zero axis in the manner represented by the full line curve 83 and the dotted curve 84 in Fig. 5 of the drawing in which values on the right hand side of the zero axis are designated as positive and values on the left hand side are designated as negative as before. By projecting the instantaneous values of these voltage curves upon the non-linear resistance current curve 77, curves of the instantaneous values of the currents through the non-linear resistance 54 and 55 are obtained which are represented by the full line curve 85 and the dotted curve 86 respectively, in which the values above the zero axis are designated as positive and values below the zero axis are designated as negative. These currents have a negative direct current component, the magnitude of which is represented by the broken line 87. These negative components of direct current deflect the needle 82 of the galvanometer in the opposite direction or to the right thus indicating to the pilot that the airplane has deviated from its course to the left and that he must steer to the right in order to bring the airplane back upon the desired course.

The description of the operation of the simplified modification of the invention illustrated in Fig. 3 will readily be understood from the above description since it is identical in all respects with the operation of either of the two series circuits of which the bridge circuit of Fig. 2 is composed.

In addition to its utilization as a remote indicating compass, the invention may, if desired, be utilized as the direction sensitive element of an automatic steering system in which the rudder control apparatus is connected in a manner similar to that in which the indicating instruments are connected.

Although in accordance with the provisions of the patent statutes, I have described this invention as embodied in concrete form, it will be understood that the forms and modifications are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:

1. A magnetic field direction responsive system comprising an electric circuit, means for supplying a periodically varying voltage having a substantially symmetrical wave form to said circuit, means responsive to said magnetic field and connected to said circuit for changing the symmetry of the wave form of said voltage, means responsive to said changed voltage for producing a direct current in said circuit, and an electroresponsive device actuated by said direct current.

2. An indicating system comprising an alternating current circuit, a coil in said circuit having an alternating magnetic flux produced by the current therein and arranged to be threaded by a direct magnetic flux for increasing said alternating flux during one-half cycle and decreasing said alternating flux during the succeeding half cycle thereby rendering the wave form of the voltage of said circuit unsymmetrical, a direct current responsive device, and means responsive to said unsymmetrical voltage for energizing said device with direct current.

3. In direct magnetic field direction responsive systems, the combination with an electric circuit, of means for supplying an alternating current to said circuit having a substantially symmetrical wave form, means connected to said circuit and responsive to said direct magnetic field for increasing the magnetic flux produced by said current during one half cycle and diminishing said flux during the succeeding half cycle thereby rendering the voltage of said circuit unsymmetrical, means responsive to said unsymmetrical voltage for producing a direct current component in said circuit, and electroresponsive means energized by said direct current component.

4. In combination, an alternating current circuit, a reactance device provided with a stationary coil connected to said circuit and having an alternating magnetic flux produced by the current therein and arranged to be threaded by a direct magnetic flux for increasing one-half cycle of said alternating flux and decreasing the next half cycle thereof to render the wave form of the voltage non-uniform, means responsive to said non-uniform voltage for producing a component of direct current in said circuit, and indicating means responsive to said direct current component.

5. An indicating system comprising an alternating current circuit, means for supplying a periodically varying voltage to said circuit, a stationary coil adapted to be threaded by a direct magnetic flux for effecting a variation in an electrical characteristic of said circuit, a direct current electroresponsive device and means responsive to said variation for energizing said device with a direct current of a polarity corresponding to the direction of flux through said coil.

6. In combination, a source of periodically varying voltage, a circuit supplied from said source, means responsive to a magnetic field for rendering the wave form of said voltage unsymmetrical comprising a reactance device having a permeable core member adapted to be threaded by the flux of said field and provided with a stationary winding connected to said circuit, a direct current electroresponsive device and means responsive to said unsymmetrical voltage condition for energizing said device.

7. In an indicating system the combination with a circuit provided with connections to a source of periodically varying voltage, of means responsive to a magnetic field for effecting an unsymmetrical wave form of said voltage comprising a reactance device having a permeable core member for concentrating the magnetic flux of said field and a winding on said core connected to said circuit, said circuit including a non-linear resistance element for causing a direct current component as a result of said unsymmetrical voltage relay, and indicating means responsive to said direct current component.

8. A compass system comprising an alternating current circuit, means for supplying said circuit with a periodically varying voltage having substantially no direct current component, means comprising a saturable core reactance device having a stationary coil responsive to a deviation from a predetermined position in the earth's magnetic field for rendering the wave form of said voltage non-uniform, means responsive to said non-uniform voltage for producing a direct current component in said circuit, and an indicating device responsive to said direct current component.

9. A direction responsive system comprising an electric circuit, means for supplying said circuit with a periodically varying voltage having substantially no direct current component, means comprising a saturable core reactance device having a stationary coil connected to said circuit and responsive to deviations in opposite directions from a predetermined position in the earth's magnetic field for effecting oppositely unsymmetrical wave forms of said voltage, means responsive to said unsymmetrical wave forms producing in said circuit direct current components of respectively opposite polarities, and an electroresponsive device connected to said circuit for detecting said opposite voltage polarities.

10. A compass system comprising an electric circuit, means for supplying said circuit with a periodically varying voltage having substantially no direct current component, a stationary coil connected to said circuit adapted to be threaded by the flux of the earth's magnetic field responsive to deviations in opposite directions from a predetermined position in said field for effecting correspondingly opposite variations in an electrical characteristic of said circuit, means responsive to said opposite variations for producing direct current components of correspondingly opposite polarities, and a direct current indicating instrument responsive to said direct current components.

11. In combination, a circuit, means for supplying said circuit with a periodically varying current, means responsive to a magnetic field operatively connected with said circuit for effecting a variation in an electrical characteristic of said circuit, means comprising a non-linear resistance in said circuit for producing a direct current component in said circuit as a result of said variation, and a device connected to said circuit and energized responsively to said direct current component.

12. A compass system comprising a circuit, means for supplying said circuit with a periodically varying voltage, means comprising a reactance device responsive to the earth's magnetic field operatively connected with said circuit for effecting a variation in the wave form of said voltage, means comprising a non-linear resistance device in said circuit responsive to said variation for partially rectifying said voltage, and connections from said circuit to an indicating instrument in said circuit responsive to the direct current component due to said rectified voltage.

13. In a compass system, a circuit, means for supplying said circuit with a periodically varying voltage, a reactance device having a core and a coil wound thereon connected to said circuit and responsive to a deviation from a predetermined position in the earth's magnetic field for producing in said circuit an increase in the maximum value of one half cycle of said voltage and a decrease in the maximum value of the inverse half cycle of said voltage, an electroresponsive device, and rectifying means connected to said circuit and responsive to said increase and decrease for influencing said device with a direct current.

14. In a compass system, a circuit, means for supplying said circuit with a periodically varying voltage, a reactance device comprising a core having a coil wound thereon adapted to be threaded by the flux of the earth's magnetic field, said reactance device being responsive to deviations in one direction from a predetermined position in the earth's magnetic field for producing the operating condition of an increase in the maximum value of said voltage during one half cycle and a decrease during the inverse half cycle and responsive to deviation in the opposite direction from said position for effecting the operating condition of a decrease in the maximum value of said voltage during said first mentioned half cycle and a decrease during said inverse half cycle, a direct current indicating instrument connected to said circuit, and rectifying means responsive to said operating conditions for causing said instrument to be influenced with direct currents of opposite polarities respectively.

15. An inductor type direction indicating system comprising in combination, an electric circuit, means for supplying said circuit with a periodically varying voltage, a reactance device connected to said circuit and responsive to the magnetism of the earth's magnetic field for effecting a variation in the wave form of said voltage, a non-linear resistance connected to said circuit for producing direct current in response to said wave form variation, an electro-responsive indicating device for detecting voltage polarity and electrical connections from said device to said circuit.

16. In an inductor compass system, the combination with an electric circuit of a reactance device having a permeable core member adapted to be magnetized to a predetermined value in one direction by the earth's magnetic field and a winding included in said circuit, means for supplying said winding with an alternating voltage for magnetizing said core to predetermined values in opposite directions so that a variation is effected in the voltage wave form, rectifying means responsive to said variation comprising a non-linear resistance connected to said circuit, and an indicating instrument connected to said circuit for detecting the polarity of the voltage thereof.

17. In an inductor compass system, the combination with a saturable reactor having a permeable core provided with a constricted portion magnetized by the earth's field to a predetermined value in one direction in response to deviation in one direction from a predetermined position and to a predetermined value in the opposite direction in response to deviation in the opposite direction from said position, and a winding arranged upon said constricted portion, means for supplying said winding with an alternating voltage for magnetizing said constricted portion to saturation in opposite directions during opposite half cycles of said voltage so that a variation is effected in the voltage wave form during said first mentioned deviation and an opposite variation is effected in the voltage wave form during said opposite deviation, a direct current indicating device, electrical connections from said device to said winding, and rectifying means comprising a non-linear resistance included in said connections responsive to said opposite variations for influencing said indicating device with direct currents of opposite polarities respectively.

18. An earth inductor compass system comprising an elongated magnetic core member permeable to the earth's magnetic field, means for stabilizing said core member in a substantially horizontal plane so that it is influenced by the horizontal component of the earth's magnetic field, a reactive winding on said core member, a source of periodically varying voltage, electrical connections between said source and said winding, a non-linear resistance in said connections, and direct current responsive means in said connections.

19. In an inductor compass system, the combination with a support, of a saturable core reactor having a permeable core member saturable by the flux of the earth's magnetic field provided with a magnetizing winding, means for supplying an alternating voltage to said winding for magnetizing said core to predetermined values in opposite directions during opposite half cycles respectively, means pivotally supporting said reactor on said support so that under a certain operating condition said core is magnetized by the horizontal component of the earth's magnetic field in only one of said directions and a variation is effected in the voltage wave form, an electrical indicating device, and rectifying means comprising a non-linear resistance connected to said winding so that it is responsive to said wave form variation for influencing said indicating device with a direct current.

20. In a compass system, a bridge circuit, means for supplying said circuit with a periodically varying voltage, a non-linear resistance connected in each of at least two of the arms of said bridge, a reactance device comprising a core member permeable to the earth's magnetic field and provided with at least two magnetizing windings each included in an arm of said bridge, and a voltage responsive device connected in a portion of a circuit common to both arms of said bridge.

21. A compass system comprising a bridge circuit, means for supplying a periodically varying voltage to said circuit, means for effecting a variation in the wave form of said voltage comprising a reactance device having a permeable core member provided with at least two constricted portions and a winding arranged on each of said portions and included in respective arms of said bridge, rectifying means responsive to said voltage wave form variations comprising a non-linear resistance connected in each of said two arms of said bridge circuit, and a direct current indicating device connected across said bridge.

22. A compass system comprising a bridge circuit adapted to be supplied with a periodically varying current, a saturable reactor comprising a core member having at least two constricted portions adapted to be magnetized under a certain operating condition to a predetermined value by the earth's magnetic field and a winding on each of said constricted portions connected in respective arms of said bridge so that said constricted portions are magnetized to predetermined values in opposite directions respectively during one half cycle of the voltage and to different values in the reverse directions respectively during the inverse half cycle and corresponding variations are effected in the wave form of the voltage of said arms, rectifying means responsive to said voltage wave form variations comprising a non-linear resistance connected in each of said two arms of said bridge, and a direct current indicating device connected across said bridge.

23. In a compass system, a bridge circuit means for supplying a periodically varying voltage to said circuit, means responsive to deviations in opposite directions from a predetermined position in the earth's field for effecting respective opposite variations in the wave form of the voltage of said bridge comprising a saturable reactor having a permeable core adapted to be magnetized by the earth's field to a predetermined value in one direction responsively to a deviation from said position and in the opposite direction responsively to a deviation in the opposite direction and a winding on each of said constricted portions connected in respective arms of said bridge for magnetically saturating said constricted portions in opposite directions during one half cycle of said voltage and in the reverse direction respectively during the inverse half cycle, a direct current indicating instrument connected to said bridge, and rectifying means connected in said bridge circuit responsive to said opposite variations in the voltage wave form for influencing said indicating instrument with direct currents of opposite polarities respectively.

24. A compass system comprising a reactance device having a permeable core member provided with a magnetizing winding, a non-linear resistance device, an electroresponsive device calibrated for indicating direction, an electric circuit including said winding, resistance, and indicating device in series relationship, and means for supplying a periodically varying voltage to said circuit.

25. A compass system comprising an electric circuit including a non-linear resistance and a direct current indicating instrument in series relationship, means for supplying an alternating voltage to said circuit, and a reactance device comprising a permeable core member having a constricted portion provided with a magnetizing winding included in series relationship in said circuit.

HENRY P. THOMAS.